March 14, 1961 R. H. HARGREAVES 2,975,089
INDUSTRIAL MAT
Filed March 1, 1957

INVENTOR
Robert Hacking Hargreaves
BY
ATTORNEY

United States Patent Office 2,975,089
Patented Mar. 14, 1961

2,975,089
INDUSTRIAL MAT

Robert Hacking Hargreaves, Pyrford, near Woking, England, assignor to James Walker & Company Limited, Lion Works, Woking, Surrey, England Filed Mar. 1, 1957, Ser. No. 643,300

Claims priority, application Great Britain Mar. 20, 1956

4 Claims. (Cl. 154—49)

This invention relates to a new or improved industrial mat which can with advantage be used, inter alia, as a substitute for the usual wood duckboard now generally provided in engineering or industrial workshops and upon which a machine tool operator is required to stand.

Wood duckboards, although almost universally used as footboards for machine tool operators, have several recognised defects. For instance they soon become slippery by absorbing oils from the machine tools, they readily splinter and break, and they allow oily turnings or swarf to collect beneath and between their rungs.

Rubber mats have been proposed as a substitute for the wood duckboards but they tend to spread in use and they quickly acquire a slippery surface.

The objects of the present invention is to provide a new or improved industrial mat which will not readily slip on the floor of the workshop under the strain of the user, which will possess an upper surface that will retain a high coefficient of friction for a long period in relation to that of a normal wood duckboard or rubber mat thereby reducing danger to the operator from footwear slipping, which will not splinter or break, which can be cleaned quickly and easily by brushing and will not allow swarf to collect beneath it, and which can be made in a range of industrially-approved colours.

Broadly the present invention consists in an industrial mat the body of which comprises a bonded cork composition formed by moulding and has in its upper face relatively deep grooves with oppositely inclined sides, and an inclined or bevelled edge at the perimeter of the mat the angle of which is such that, in moulding, the edge thereof tends to be compressed to a greater density than the main body of the mat said grooves being spaced from each other at a distance greater than twice the width of each groove.

It is preferred that the grooves shall have their sides inclined so that the included angle is approximately 45° as such are easily kept clean by brushing, particularly if, as is also preferred, the grooves extend parallel to each other. Furthermore the edges are sufficiently pronounced as to provide an effective means to limit the danger of footwear slip. For this reason it is undesirable to incline the sides of the grooves at too great an angle.

In practice it is preferred to bevel the perimeter to a similar angle as, in moulding, its edge is given a greater density than the main body of the mat as the extra strength thus provided will be where, in use, maximum scuffing can occur.

The material from which the mat of the present invention is made is essentially a bonded cork composition, the bonding agent being either a suitable synthetic or natural rubber, and/or a plastic material with styrene resin or other suitable reinforcing or stiffening resin or any composition made from synthetic or natural rubbers and/or plastic material with suitable reinforcing or stiffening resin.

One bonded cork composition which has been found suitable in making our improved mat is made up from the following formula:

| | Parts |
|---|---|
| Synthetic rubber | 100.0 |
| Styrene reinforcing resin | 26.8 |
| Non-staining anti-oxidant | 1.4 |
| Hydrocarbon wax | 2.5 |
| Stearic acid | 2.7 |
| Sulphur | 3.8 |
| Zinc oxide | 6.7 |
| Accelerator | 2.0 |
| Granulated cork | 154.0 |

In the above formula the synthetic rubber content may include Butadiene-acrylonitrile, Butadiene-styrene and the chloroprene types.

An example of an industrial mat according to the present invention is illustrated in the accompanying drawings in which.

Figure 1:
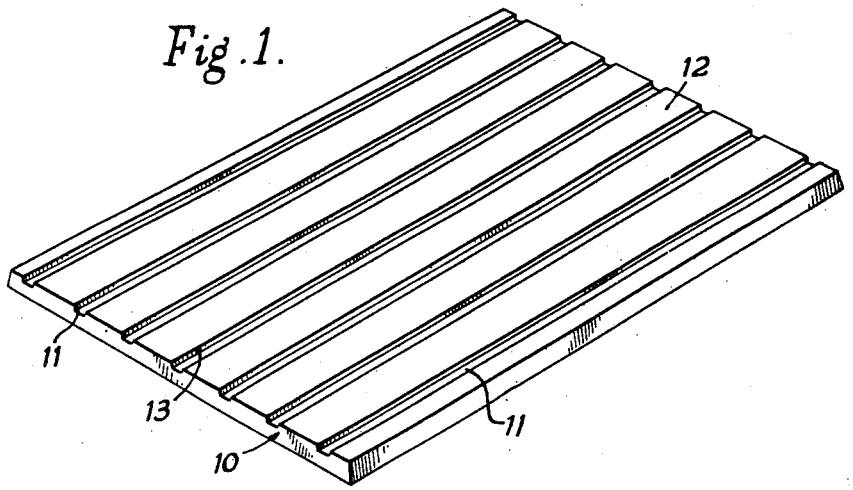
Fig. 1 is a perspective view of the mat when viewed from above.

The body 10 of the industrial mat illustrated in the drawings is composed of bonded cork compressed in a mould to a generally flat rectangular formation with a series of deep parallel grooves 11 in its upper face 12 said grooves being spaced from each other at a distance greater than twice the width of each groove. Each of these grooves has sides 13 which are oppositely and outwardly inclined so that the width at the bottom of each groove is substantially less than the width at the top of each groove, and the angle of inclination of each opposing side is preferably such as will result in an included angle of 45°.

It has been found that grooves having the above formation can be maintained free from swarf and debris by a quick and easy application of a brush.

It has also been found that in forming the grooves with the above inclined sides by moulding bonded cork under pressure the material composing the upper edges of the grooves has a tendency to be given a density greater than the main body of the mat thus reducing wear at those parts of the grooves at which maximum scuffing can occur.

Figure 2:
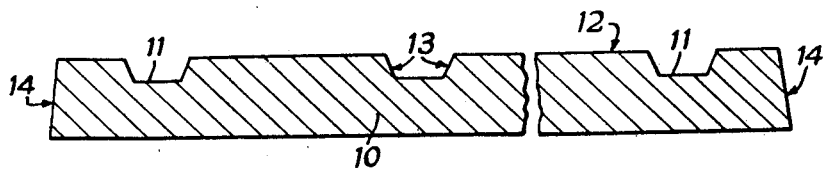
Fig. 2 is a cross section thereof to an enlarged scale.

It is preferred to bevel the boundary or outside edge faces of the mat to a similar angle in the manner shown in Fig. 2 where two of such faces are shown and indicated by the numeral 14.

In this specification stress has been laid upon the use of the invention as a substitute for the usual duckboard in engineering or industrial workshops, for which purpose it has obvious advantages some of which have been set out in this specification and others of which include the following:

(a) It provides a completely non-slip surface.

(b) Comfortable to the user as it almost completely absorbs vibration from the floor.

(c) To the feet it is warm in winter and cool in summer.

(d) It is both tough and flexible and will withstand rough handling far better than the usual wooden duckboard. It also has a much longer "life" than the normal duckboard.

(e) It cannot break or splinter and will thus not cause the accidents which frequently occur for this reason with the wooden duckboard.

(f) It is resilient and any fragile object dropped on it is less likely to fracture than is the case with a wooden duckboard.

(g) It can easily be cleaned by a single sweep of a broom.

(h) It is specially reinforced at the points where maximum scuffing is likely to occur and the sides are bevelled and the corners may be rounded.

(i) Nothing can roll under the mat as it sits flatly on the floor and it is easy to stack for storage.

(j) It can be made available in a range of colours based on accepted industrial shades such as black, green, static grey, static blue, static stone and natural cork.

It is to be understood that the invention is not to be limited to use in engineering or industrial workshops as the advantages arising from the construction of the improved mat render the same capable of use in many other directions.

What we claim is:

1. A resilient non-slip and oil-resistant industrial floor mat with deep parallel grooves having oppositely outwardly inclined sides defining an included angle of substantially 45 degrees comprising a wear-resistant body including heat and pressure bonded granulated cork and rubber, the cork being in excess of the rubber by weight and the edges of the mat and the upper edges of the sides of the grooves having a greater density than the main body of the mat whereby to strengthen the resistance of the edges of the mat against wear.

2. A resilient non-slip and oil-resistant industrial floor mat with deep parallel grooves having oppositely outwardly inclined sides defining an included angle of substantially 45 degrees comprising a wear-resistant body including 154 parts by weight of granulated cork, 100 parts by weight of synthetic rubber, 26.8 parts by weight of styrene reinforcing resin, 1.4 parts by weight of non-staining anti-oxidant, 2.5 parts by weight of hydrocarbon wax, 2.7 parts by weight of stearic acid, 3.8 parts by weight of sulphur, 6.7 parts by weight of zinc oxide and 2 parts by weight of accelerator bonded by heat and pressure, and the edges of the mat and the upper edges of the sides of the grooves having a greater density than the main body of the mat whereby to strengthen the resistance of the edges of the mat against wear.

3. A resilient non-slip and oil-resistant industrial floor mat with deep parallel grooves spaced from each other a distance greater than twice the width of each groove and having oppositely outwardly inclined sides defining an included angle of substantially 45 degrees comprising a wear resistant body including heat and pressure bonded granulated cork and synthetic rubber, the cork being in excess of the synthetic rubber of the order of substantially an additional 50 parts by weight for every 100 parts by weight of synthetic rubber and the edges of the mat and the upper edges of the sides of the grooves having a greater density than the main body of the mat whereby to strengthen the resistance of the edges of the mat against wear.

4. A resilient non-slip and oil-resistant industrial floor mat with deep parallel grooves spaced from each other a distance greater than twice the width of each groove and having oppositely outwardly inclined sides defining an included angle of substantially 45 degrees and with end walls bevelled at an angle of substantially 45 degrees comprising a wear resistant body including 154 parts by weight of granulated cork, 100 parts by weight of synthetic rubber, 26.8 parts by weight of styrene reinforcing resin, 1.4 parts by weight of non staining anti-oxidant, 2.5 parts by weight of hydrocarbon wax, 2.7 parts by weight of stearic acid, 3.8 parts by weight of sulphur, 6.7 parts by weight of zinc oxide and 2 parts by weight of accelerator bonded by heat and pressure, and the edges of the mat and the upper edges of the sides of the grooves having a greater density than the main body of the mat whereby to strengthen the resistance of the edges of the mat against wear.

References Cited in the file of this patent

UNITED STATES PATENTS

| | | |
|---|---|---|
| 1,255,373 | Winkler | Feb. 5, 1918 |
| 1,964,348 | Gammeter | June 26, 1934 |
| 2,087,942 | West | July 27, 1937 |
| 2,196,407 | Atkinson | Apr. 9, 1940 |
| 2,269,440 | De Holczer | Jan. 13, 1942 |
| 2,471,870 | Gidley | May 31, 1949 |
| 2,560,420 | Dodge | July 10, 1951 |
| 2,585,108 | Gordon | Feb. 12, 1952 |
| 2,652,384 | Sayko et al. | Sept. 15, 1953 |
| 2,734,402 | Carter et al. | Feb. 7, 1956 |
| 2,739,082 | Bezman et al. | Mar. 20, 1956 |

FOREIGN PATENTS

| | | |
|---|---|---|
| 8,324 | Great Britain | 1897 |
| 657,813 | Great Britain | Sept. 26, 1951 |
| 30,087 | Netherlands | June 15, 1933 |
| 852,285 | Germany | Oct. 13, 1952 |